United States Patent
Kang

[11] Patent Number: 6,030,127
[45] Date of Patent: Feb. 29, 2000

[54] GUIDER ASSEMBLY FOR ROTARY COMPONENT

[75] Inventor: Nae-Wan Kang, Kyungki-do, Rep. of Korea

[73] Assignee: SamSung Electronics Co., Ltd., Kyungki-do, Rep. of Korea

[21] Appl. No.: 09/094,727

[22] Filed: Jun. 15, 1998

[30] Foreign Application Priority Data

Jun. 13, 1997 [KR] Rep. of Korea ....................... 97-14112

[51] Int. Cl.[7] ................................... F16C 35/02
[52] U.S. Cl. .................. 384/416; 384/58; 384/295; 384/903; 403/383; 411/353; 411/512
[58] Field of Search ................................ 384/50, 53, 58, 384/59, 295, 416, 418, 419, 428, 903, 549; 411/353, 352, 512, 517, 525, 526; 403/383, 380, 375, 329

[56] References Cited

U.S. PATENT DOCUMENTS

| | | | |
|---|---|---|---|
| 2,166,130 | 7/1939 | Coe | 403/375 |
| 2,487,803 | 11/1949 | Heimann | 384/903 X |
| 2,558,704 | 6/1951 | Heimann et al. | 411/517 |
| 2,968,503 | 1/1961 | Ferrara et al. | 403/375 |
| 3,380,766 | 4/1968 | Meibuhr | 384/540 X |
| 3,595,123 | 7/1971 | Wurzel | 411/517 |
| 3,709,530 | 1/1973 | Redding | 403/375 X |
| 4,352,586 | 10/1982 | Hayden | 403/375 X |
| 4,603,597 | 8/1986 | Onorati | 403/383 X |
| 4,952,093 | 8/1990 | Murakami | 403/261 |
| 5,357,847 | 10/1994 | Stewart | 403/375 X |
| 5,386,739 | 2/1995 | Serrano et al. | 403/375 X |
| 5,462,369 | 10/1995 | Layne et al. | 384/538 |
| 5,660,484 | 8/1997 | Peel | 384/539 |

*Primary Examiner*—Thomas R. Hannon
*Attorney, Agent, or Firm*—Robert E. Bushnell, Esq.

[57] ABSTRACT

A guider assembly for a rotary component idles about a given point on a shaft, and the shaft has a race at both sides of an idling space in which the rotary component is turned. A guider of the assembly has tension ribs held in the race for allowing the rotary component to idle about a predetermined point on the shaft. In addition, in the inventive guider assembly, the shaft has a race formed at both sides thereof and on a part of its outer surface, and the guider has a shaft hole into which the shaft fits, and tension ribs formed at one side of the shaft hole and held in the race.

38 Claims, 7 Drawing Sheets

GUIDER ASSEMBLY FOR ROTARY COMPONENT

CLAIM OF PRIORITY

This application makes reference to, incorporates the same herein, and claims all benefits accruing under 35 U.S.C. §119 from an application for GUIDER ASSEMBLY FOR ROTARY COMPONENT earlier filed in the Korean Industrial Property Office on Jun. 13, 1997 and there duly assigned Ser. No. 14112/1997.

BACKGROUND OF THE INVENTION

1. Technical Field

The present invention relates to a guider assembly for a rotary component which idles about a shaft, the guider assembly being improved to facilitate an assembly process directing the rotation of the rotary component.

2. Related Art

Most machines or apparatus have rotary components which idle about a shaft and, as already well known, it is preferable that each rotary component idle smoothly without being dislocated from its shaft.

Devices helping to idle rotary components about their shafts are used in office automation machines, such as facsimile machines, printers, etc. For example, a plurality of idle rollers are equidistantly installed on a single shaft for idling.

As described in more detail below, a problem arises when a plurality of rotary components are mounted on a single shaft. In that case, assembly of the rotary components on the shaft becomes problematic. Specifically, the rotary components are mounted on the shaft in sequence from one side of the shaft, and each of the rotary components is moved to a given position on the shaft, where it is held in place by circular races, two for each rotary component disposed on the one side and on the other side, respectively, of the rotary component.

Therefore, during assembly of the rotary components by sequentially mounting them on the shaft, and then sliding them to their given positions, each rotary component passes the races of the other rotary components until it finally arrives at its own position and is secured by its own races. Thus, a worker who is assembling the rotary components on the shaft has to manipulate each rotary component past the circular races prior to engaging its own circular race; this sliding and component manipulation during the assembly process it very inconvenient.

Therefore, there is a need for the development of an improved guider assembly for a rotary component, in which assembly of the plurality of rotary components on a shaft is facilitated.

The following patents are considered to be representative of the prior art, and are burdened by the disadvantages set forth herein: U.S. Pat. No. 5,660,484 to Peel, entitled Shaft With Bearing Assembly, U.S. Pat. No. 5,462,369 to Layne et al., entitled Bearing Lock System, U.S. Pat. No. 5,386,739 to Serrano et al., entitled Return Device For A Starter Head For AN Internal Combustion Engine, U.S. Pat. No. 5,357,847 to Pressure Vessels Having End Closures And Retailers, U.S. Pat. No. 4,603,597 to Onorati, entitled Drive System, U.S. Pat. No. 3,709,530 to Redding, entitled Auxiliary Retention For A.C. Washer, U.S. Pat. No. 3,380,766 to Meibuhr, entitled Screw Thread Insert, U.S. Pat. No. 4,352,586 to Hayden, entitled Linkage System, U.S. Pat. No. 2,968,503 to Ferrara et al., entitled Snap Ring Assembly, and U.S. Pat. No. 2,166,130 to Coe, entitled Removable Locking Device.

SUMMARY OF THE INVENTION

Accordingly, the present invention is directed to an improved guider assembly for a rotary component which idles about a shaft, the improvement substantially obviating one or more of the problems, limitations and disadvantages discussed above.

An object of the present invention is to provide an improved guider assembly for a rotary component which idles about a shaft, directing the idling rotary component, and thus facilitating its assembly.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention comprises a guider assembly for a rotary component idling about a given point of a shaft, wherein the shaft has a race at both sides of its idling space in which the rotary component is turned, and a guider having tension ribs held in the race for allowing the rotary component to idle about a predetermined point on the shaft According to another aspect of the present invention, a guider assembly for a rotary component idling about a given point of a shaft includes the feature whereby the shaft has a race formed at both sides thereof and on a part of its outer surface. In addition, a guider has a shaft hole into which the shaft fits and tension ribs formed at one side of the shaft hole and held in the race.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1A:
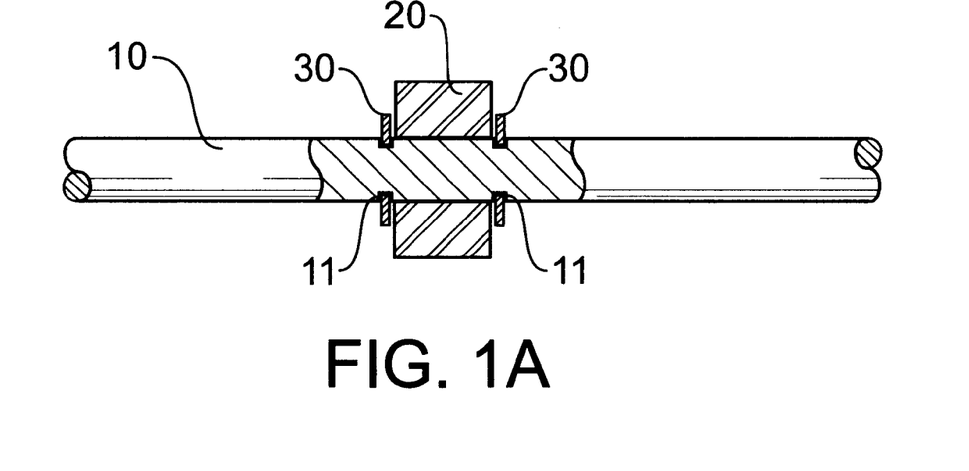
FIG. 1A is a sectional view of a guider assembly for a rotary component
Figure 1B:
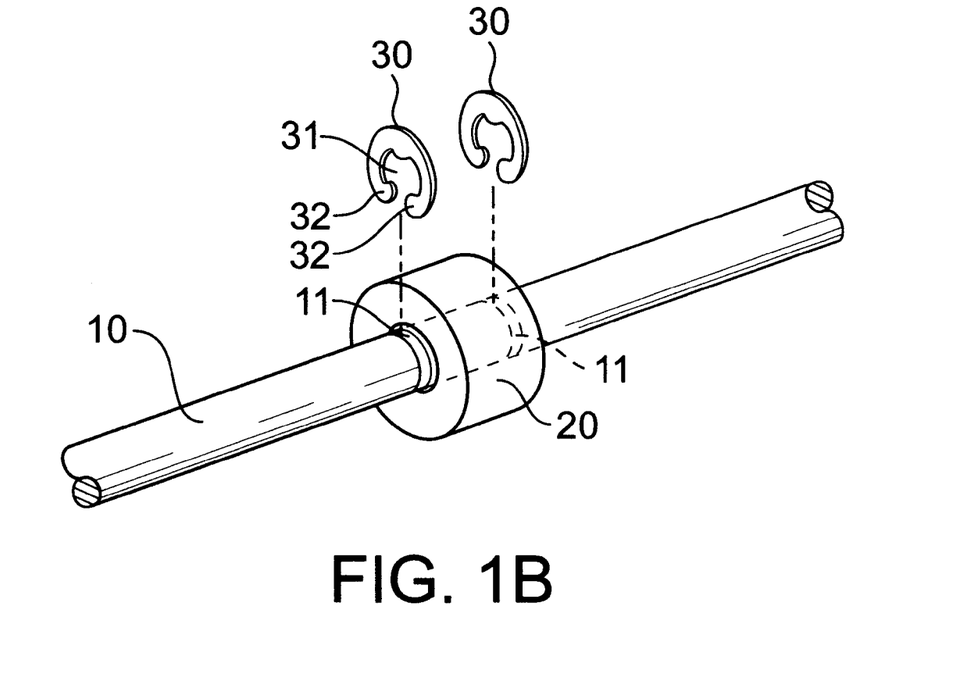
FIG. 1B is a partially-exploded perspective view of the guider assembly for a rotary component of FIG. 1A.

FIGS. 1A and 1B depict a rotary component provided to a shaft for idling. As seen in FIGS. 1A and 1B, circular races 11 are formed on a shaft 10 about which a rotary component 20 idles, thus preventing rotary component 20 from moving to the right and left in FIG. 1A, and E-rings 30 each mate with the circular races 11.

Each of E-rings 30 has an opening 31 into which shaft 10 fits. Since the width of each opening 31 is smaller than the diameter of shaft 10 within circular race 11, E-ring 30 is inserted into circular race 11 by widening the space 31 between both ends 32 of E-ring 30. However, it is hard to insert E-rings 30 into circular races 11. Therefore, additional tools or jigs for E-ring assembly are needed in mass production, and E-ring assembly is difficult and takes time.

Shaft 10 and rotary component 20 used for office automation machines are about 5 to 6 mm and 8 to 10 mm, respectively, in diameter, and are relatively small. E-rings 30 as used in such small components are much smaller, and even if the E-ring is inserted into circular race 11 by the use of a tool or jig, it is troublesome and lowers productivity.

Figure 2A:
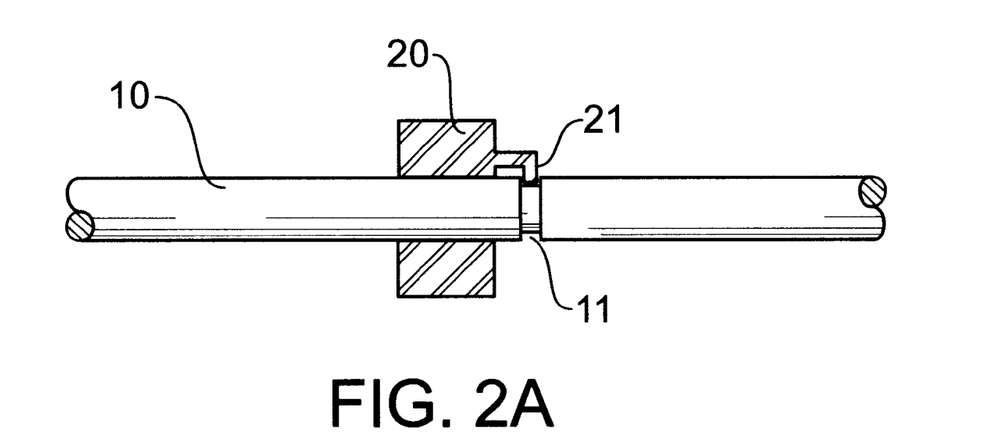
FIG. 2A is a sectional view of a second guider assembly for a rotary component
Figure 2B:
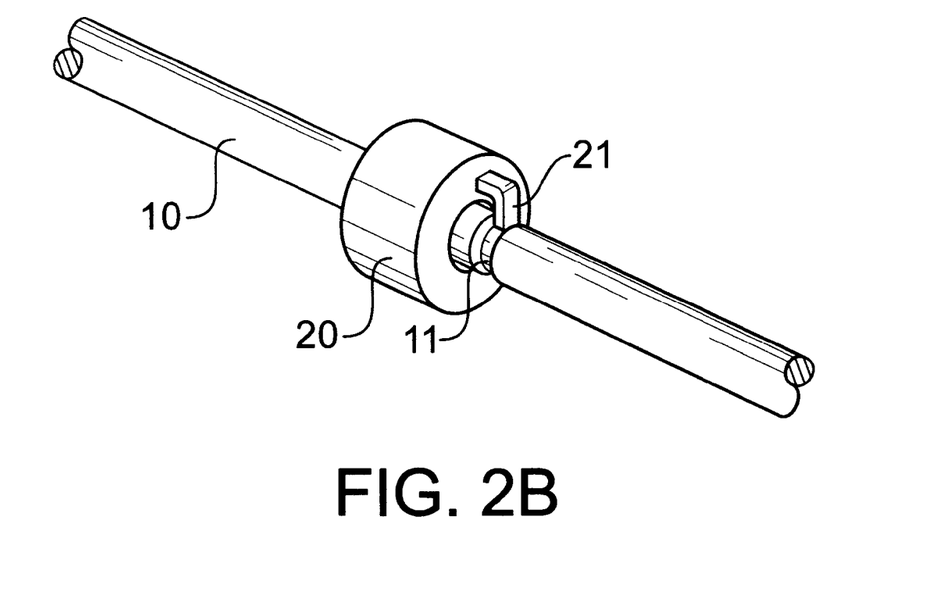
FIG. 2B is a perspective view of the guider assembly for a rotary of FIG. 2A.

FIGS. 2A and 2B depict a second arrangement for improving E-ring assembly.

According to the second arrangement, a single circular race 11 necessary for one rotary component 20 is formed on a shaft 10, and l-shaped snap fit 21 is provided to one side of rotary component 20. Rotary component 20 is generally made of plastic by injection molding. Snap fit 21 is integrally formed with rotary component 20 at the time of injection molding. The plastic snap fit 21 has an elasticity, and returns to or maintains its original state by elasticity. Rotary component 20 is mounted on shaft 10 from one end of the shaft 10. Then, snap fit 21 is pushed from the outer circumference of shaft 10, and is bent slightly upward. Rotary component 20 is moved along shaft 10 and, as it reaches circular race 11, bent snap fit 21 is inserted into circular race 11 by virtue of its elasticity.

Rotary component 20 idles about shaft 10 without moving since snap fit 21 is held in circular race 11, and rotary component 20 and snap fit 21 idle together.

The second arrangement of FIGS. 2A and 2B has the following problem. If one rotary component with a snap fit is provided on a single shaft, there is no special problem.

Figure 3:
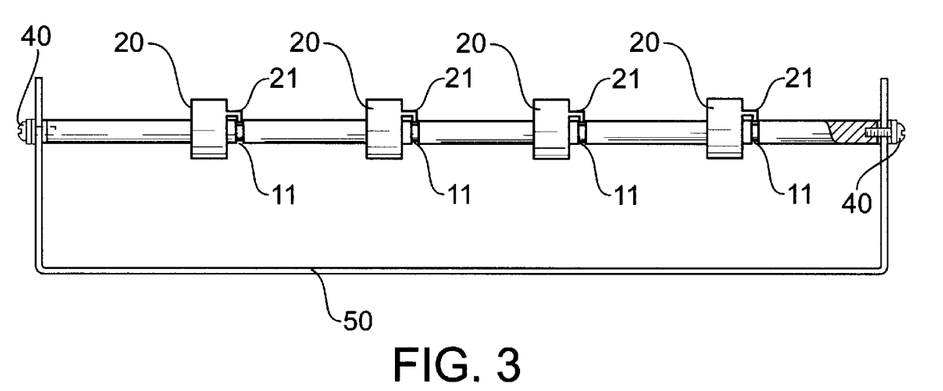
FIG. 3 depicts the guider assembly of FIGS. 2A and 2B in use.

However, as shown in FIG. 3, if a plurality of rotary components 20 are provided on one shaft 10, its assembly becomes problematic. That is, after rotary components 20 are equidistantly provided on shaft 10, shaft 10 is joined to a supporting member 50 by coupling means, such as screws 40, so that rotary components 20 may idle about given respective points on shaft 10.

Rotary components 20 are put on shaft 10 in sequence from one side of shaft 10, and each of rotary components 20 is moved to a given position and assembled for idling. In this mounting process, one of rotary components 20 that will be mounted at the halfway point on shaft 10 has to pass one or more of circular races 11 of shaft 10, and its snap fit 21 is held in every circular race 11 for a moment. This causes inconvenience in the assembly process.

More specifically, snap fit 21 of rotary component 20 has elasticity and, if rotary component 20 is moved so as to be mounted at a halfway point on shaft 10, snap fit 21 of rotary component 20 is temporarily inserted into one or more of circular races 11 until it reaches its desired position. Thus, a worker has to remove snap fit 21 from each circular race 11, and then fit snap fit 21 into its corresponding circular race 11. Thus, it is time-consuming and annoying to join plural rotary components 20 to shaft 10.

Since snap fit 21 of rotary component 20 is relatively small, it is hard to remove snap fit 21 from circular race 11, and snap fit 21 may be broken at the time of removal. Therefore, the rotary component assembly must be carried out with special care. In addition, disassembling rotary components 20 from the shaft 10 requires special tools and precautions, and it is difficult to rejoin the rotary components to the shaft or replace them with new ones, and snap fits 21 may be easily broken.

FIGS. 4 to 9 depict a guider assembly in accordance with the present invention.

Figure 5:
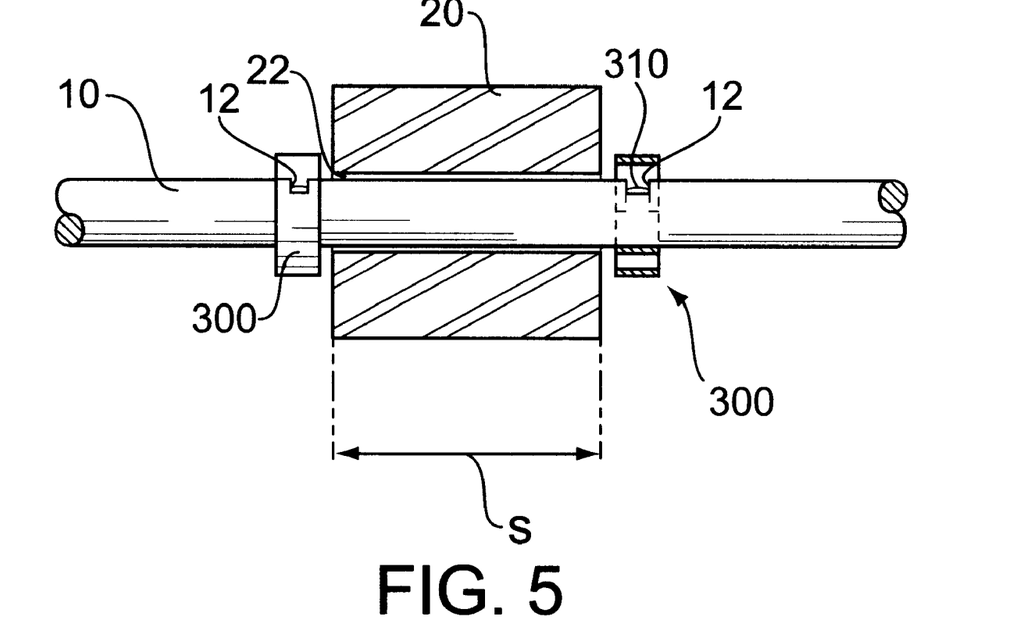
FIG. 5 is a sectional view of the rotary component mounted on a shaft by means of inventive guiders.
Figure 6:
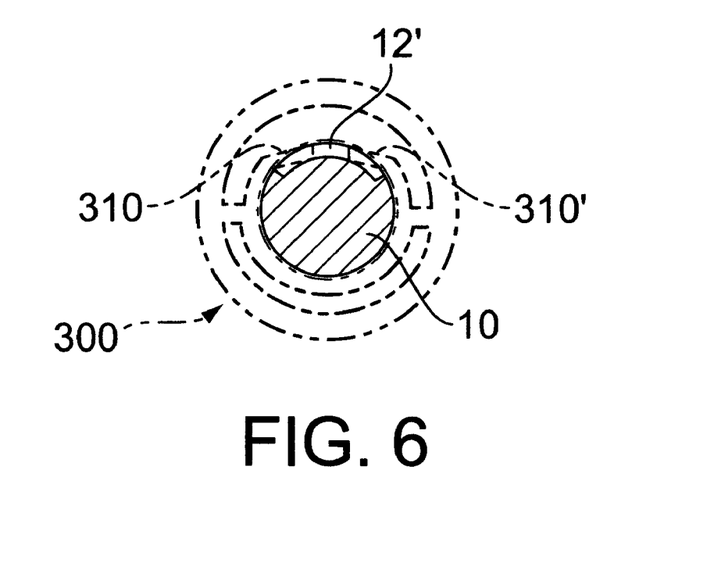
FIG. 6 is a sectional view of a coupling race of the shaft to which the inventive guider is provided.

Referring to FIG. 5, the guider assembly includes a shaft 10 fixed to a frame in a machine or apparatus, a rotary component 20 which idles about shaft 10, and guiders 300 for preventing rotary component 20 from being dislocated from its position.

Figure 4:
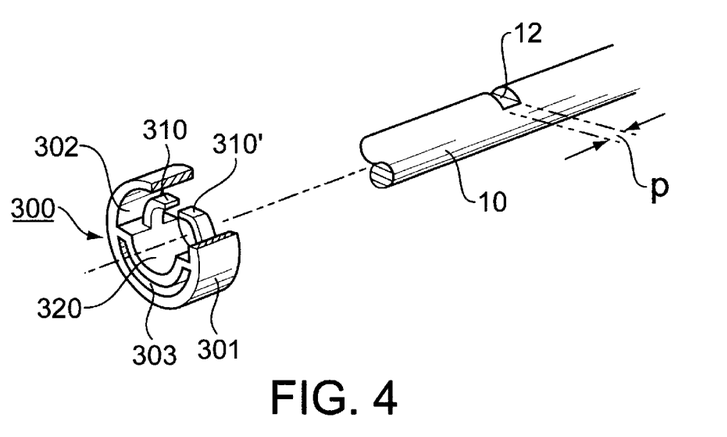
FIG. 4 is a partially-exploded perspective view of a guider assembly for a rotary component in accordance with the present invention.

Referring to FIGS. 4 and 5, shaft 10 has a race 12 at both sides of an idling space S formed for idling rotary component 20. Race 12 is formed to a size of one third of the diameter of shaft 10. When a plurality of races 12 is formed to install a plurality of rotary components 20, races 12 are formed on shaft 10 in one direction for consistency in the cutting operation which forms races 12 and to facilitate the assembly of rotary component 20. Race 12 of shaft 10 is formed so as to be planar by a cutting operation, as shown in FIG. 4. However, race 12 may be formed so as to be curved concentric with the outer surface of shaft 10, as shown by reference numeral 12' in FIG. 6.

Rotary component 20 is formed by molding, as shown in FIG. 5, and has a shaft hole 22 into which shaft 10 fits.

Figure 7A:
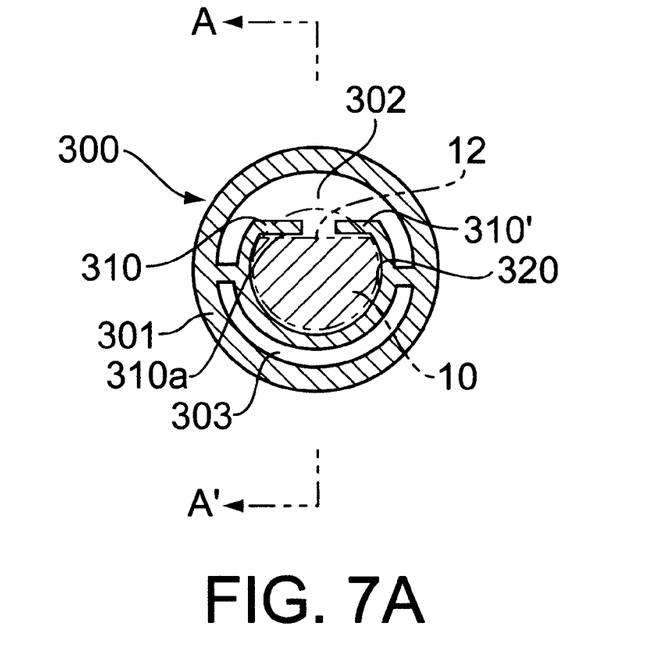
FIG. 7A is a sectional view of the guider assembly in accordance with the present invention.
Figure 7B:
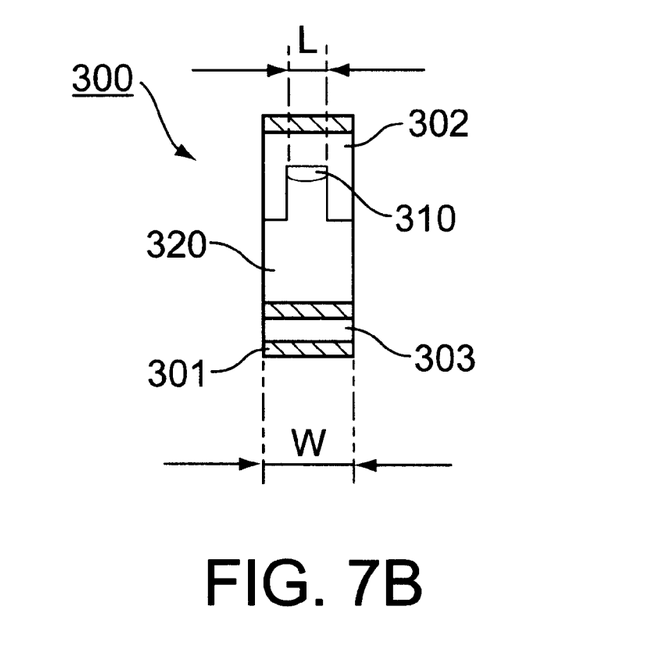
FIG. 7B is a sectional view, as taken along line A–A' of FIG. 7A.

Referring to FIGS. 7A and 7B, guider 300 has a predetermined width w, and has tension ribs 310 and 310' at its middle. Tension ribs 310 and 310' are opposed to each other, as shown in FIG. 7A, and have a rib width L which is a little smaller than a width p (FIG. 4) of race 12 of shaft 10. Tension ribs 310 and 310' are inserted into race 12. Tension ribs 310 and 310' have a rib width L which is smaller than guide width w inside body 301 of the guider assembly, and are concealed from view. They are level with each other in a shaft hole 320 into which shaft 10 fits. An inside 310a (FIG. 7A) of tension ribs 310 and 310' is smoothly formed so that guider 300 is free to slide. Body 301 of the guider assembly has a tension space 302 so that tension ribs 310 and 310' can spread and shrink. To form the guider assembly in a preferred structure, semi-circular inner space 303 is formed inside of body 301 in opposition to tension space 302. Inner space 303 has no special function in the inventive guider assembly, and there is no need to form inner space 303. Tension ribs 310 and 310', opposite to each other at one side of shaft hole 320 of guider 300, as shown in FIG. 7A, may have tension.

Figure 8A:
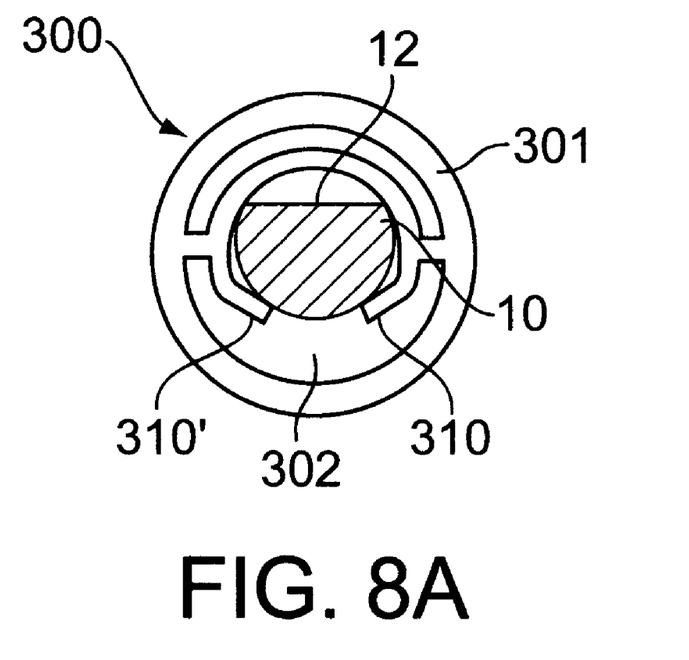
FIG. 8A is a sectional view of the guider assembly joined to the shaft in the initial stage in accordance with the present invention.
Figure 8B:
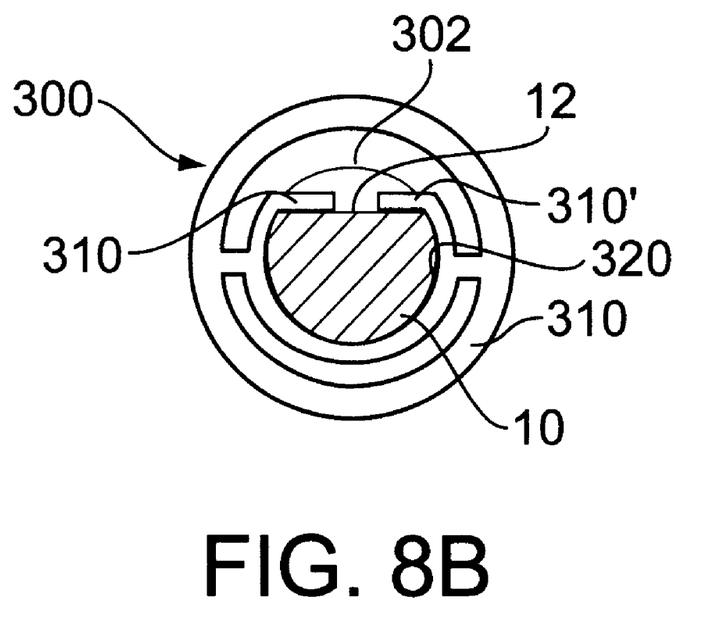
FIG. 8B is a sectional view of the guider assembly completely joined to the shaft in accordance with the present invention.

FIGS. 8A and 8B are each sectional views of the guider assembly joined to shaft 10, and the operation and assembly thereof are described referring to them.

Guider 300 is joined to shaft 10 in such a manner that shaft 10 fits into its shaft hole 320 from its one end. As shown in FIG. 8A, guider 300 is moved to a desired coupling point after inserting shaft 10 into shaft hole 320, while the tension ribs 310 and 310' of guider 300 are located at a position where there is no race 12. If guider 300 is joined to shaft 10 as shown in FIG. 8A, tension ribs 310 and 310' are pushed by the outer surface of shaft 10 and the interval therebetween becomes wider. Once guider 300 is moved, tension ribs 310 and 310' slip along the outer surface of shaft 10, and the movement of tension ribs 310 and 310' becomes smooth without being caught in race 12 disposed at a point of shaft 10 where guider 300 passes.

After moving guider 300 to a desired coupling point, guider 300 itself is 180°-turned. As guider 300 is rotated, tension ribs 310 and 310' are turned to a position where race 12 of shaft 10 is formed, as shown in FIG. 8B. Tension ribs 310 and 310' fit into race 12 of shaft 10 by virtue of their tension. Accordingly, tension ribs 310 and 310' of guider 300 are being held in race 12 of shaft 10, thus preventing guider 300 from being dislocated from its coupling point. Guider 300 is kept in a coupling state in which it does not rotate about shaft 10 unless a predetermined external force is applied to guider 300.

That is, tension ribs 310 and 310' of guider 300 are held in race 12 by a tension force. Guider 300 is joined to shaft 10 so that it is not moved in any direction, even if the rotating force of rotary component 20 contacting guider 300 is transmitted thereto.

Referring to FIG. 5, the case where rotary component 20 idles about shaft 10 by two guiders 300 is now fully described.

After guider 300 is joined in such a manner that its tension ribs 310 and 310' are inserted into the races 12 formed at right and left side, respectively, of idling space S, it is moved to a point where rotary component 20 is put on shaft 10.

Since rotary component 20 simply has shaft hole 22, it passes without being caught in any race 12 of shaft 10, which makes it easy to join rotary component 20 to shaft 10.

After rotary component 20 is moved to guider 300, guider 300 is joined to shaft 10 so as to guide the opposite side of rotary component 20. After putting guider 300 on shaft 10 while its tension ribs 310 and 310' are oppositely disposed with respect to race 12, when guider 300 reaches a coupling point, tension ribs 310 and 310' are caught in race 12 so that single rotary component 20 can idle about shaft 10 by two guiders 300.

For disassembling guider 300 from shaft 10, guider 300 is 180°-rotated to remove tension ribs 310 and 310' from race 12; this is depicted in FIG. 8A. At this point, guider 300 is made by injection molding, and tension ribs 310 and 310' have elasticity so as to be opened to the outside. Therefore, if guider 300 is forced to rotate, tension ribs 310 and 310' turn along the outer surface of shaft 10 and are opened. After that, guider 300 is separated from one end of shaft 10, so that rotary component 20 is separated from shaft 10 and another guider 300 is then disassembled therefrom.

Figure 9:
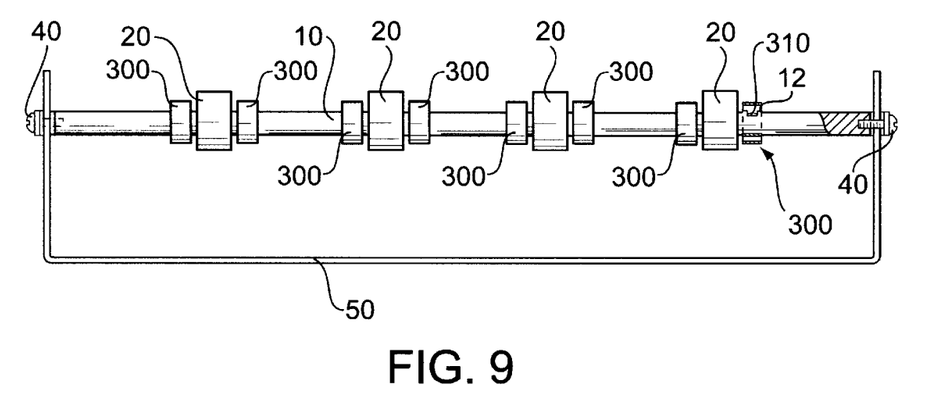
FIG. 9 depicts the inventive guider assembly in use.

FIG. 9 depicts a plurality of rotary components 20 provided on one shaft 10 for idling about shaft 10. Rotary components 20 are each mounted at given positions of shaft 10 so as to idle about shaft 10, and shaft 10 is installed on a supporting member 50 by screws 40. However, the present invention makes it easy to install several rotary components 20 onto one shaft 10 for idling. That is, guider 300 is pushed and put on shaft 10 without being caught in any other race 12 which guider 300 passes at the time of its being joined to shaft 10, and the other guiders can be easily joined to shaft 10 in the above manner. In addition, rotary component 20 and guider 300 may be easily dismounted from shaft 10. In particular, rotary components 20 that tend to move to the right and left (in the drawing) on shaft 10 are restricted by guider 300, and guider 300 which helps to turn each rotary component 20 at a given position is easily installed on shaft 10 without using any tool or jig.

Guider 300 may be joined to shaft 10 without regard to the position of rotary component 20, and this facilitates the assembly.

In conclusion, as described above, the inventive guider directs the rotary components which tend to move axially on the shaft, and makes it easy to mount/dismount each of them at any position of the shaft. Thus, the present invention has an advantageous yield aspect, and assures an improvement in the assembly process.

It will be apparent to those skilled in the art that various modifications and variations can be made in the guider for a rotary component of the present invention without departing from the spirit or scope of the invention. Thus, it is intended that the present invention cover the modifications and variations of this invention provided they come within the scope of the appended claims and their equivalents.

What is claimed is:

1. A guider assembly for a rotary component idling about a given point of a shaft within an idling space of the shaft, wherein said shaft has a pair of races, each of said races being formed on said shaft on a respective side of said idling space;

said assembly comprising a pair of guiders, each said guider having tension ribs held in a respective one of said races for allowing the rotary component to idle about said given point of the shaft.

2. A guider assembly according to claim 1, wherein the shaft has an outer surface on which no working process is performed so as not to hold the tension ribs of the guider during sliding.

3. A guider assembly according to claim 1, wherein each said race of the shaft has a planar bottom.

4. A guider assembly according to claim 1, wherein each said race of the shaft has a curved bottom concentric with the shaft.

5. A guider assembly according to claim 1, wherein each of the tension ribs of each said guider has sufficient tension to be opened when contacting an outer surface of the shaft, and has sufficient elasticity to closely contact a bottom of said respective one of said races when disposed therein.

6. A guider assembly according to claim 5, wherein said tension ribs comprise two tension ribs which are oppositely disposed with respect to each other.

7. A guider assembly according to claim 6, wherein said two tension ribs are level with each other.

8. A guider assembly according to claim 1, wherein each said guider has a body surrounding a shaft hole, and said tension ribs are disposed inside said body.

9. A guider assembly according to claim 8, wherein a tension space is formed between the body and the tension ribs so that the tension ribs can be bent.

10. A guider assembly according to claim 1, wherein the tension ribs of each said guider are positioned on an outer surface of said shaft at an initial assembly stage, and each said guider is moved to a predetermined point, and wherein each said guider is rotated on said shaft so as to hold the tension ribs in a respective one of the races of the shaft when movement of each said guider to the predetermined point is completed.

11. A guider assembly according to claim 1, wherein each said guider has a body surrounding a shaft hole, and wherein an inner space is formed between the shaft hole, opposite to the tension ribs of the guider, and the body.

12. A guider assembly according to claim 1, wherein the guider is made by molding.

13. A guider assembly according to claim 1, wherein the tension ribs may be positioned on one of a right side and a left side relative to a center of the guider according to at least one of a structural characteristic and a guiding characteristic of the rotary component.

14. A guider assembly for a rotary component idling about a given point of a shaft, wherein said shaft has a race formed on a part of an outer surface of said shaft and on a side of said given point;

said guider assembly comprising a guider having a shaft hole into which the shaft fits, and tension ribs formed at one side of the shaft hole and held by tension in said race.

15. A guider assembly according to claim 14, wherein the race of the shaft has a plane bottom.

16. A guider assembly according to claim 14, wherein the tension ribs are plural and are formed two-dimensionally.

17. A guider assembly according to claim 14, wherein the shaft has an outer surface on which no working process is performed so as not to hold the tension ribs of the guider during sliding.

18. A guider assembly according to claim 14, wherein each said race of the shaft has a planar bottom.

19. A guider assembly according to claim 14, wherein each said race of the shaft has a curved bottom concentric with the shaft.

20. A guider assembly according to claim 14, wherein each of the tension ribs of each said guider has sufficient tension to be opened when contacting an outer surface of the shaft, and has sufficient elasticity to closely contact a bottom of said respective one of said races when disposed therein.

21. A guider assembly according to claim 20, wherein said tension ribs comprises two tension ribs which are oppositely disposed with respect to each other.

22. A guider assembly according to claim 21, wherein said two tension ribs are level with each other.

23. A guider assembly according to claim 14, wherein each said guider has a body surrounding a shaft hole, and said tension ribs are disposed inside said body.

24. A guider assembly according to claim 23, wherein a tension space is formed between the body and the tension ribs so that the tension ribs can be bent.

25. A guider assembly according to claim 14, wherein the tension ribs of each said guider are positioned on an outer surface of said shaft at an initial assembly stage, and each said guider is moved to a predetermined point, and wherein each said guider is rotated on said shaft so as to hold the tension ribs in a respective one of the races of the shaft when movement of each said guider to the predetermined point is completed.

26. A guider assembly according to claim 14, wherein each said guider has a body surrounding a shaft hole, and wherein an inner space is formed between the shaft hole, opposite to the tension ribs of the guider, and the body.

27. A guider assembly for a rotary component idling about a given point of a shaft within an idling space of the shaft, wherein said shaft has at least one race formed on said shaft on a side of said idling space;

said assembly comprising at least one guider having tension ribs held in said at least one race for allowing the rotary component to idle about said given point of the shaft;

wherein each of the tension ribs of said at least one guider has sufficient tension to be opened when contacting an outer surface of the shaft, and has sufficient elasticity to closely contact a bottom of said at least one race when disposed therein.

28. A guider assembly according to claim 27, wherein said tension ribs comprise two tension ribs which are oppositely disposed with respect to each other.

29. A guider assembly according to claim 28, wherein said two tension ribs are level with each other.

30. A guider assembly according to claim 27, wherein each said guider has a body surrounding a shaft hole, and said tension ribs are disposed inside said body.

31. A guider assembly according to claim 30, wherein a tension space is formed between the body and the tension ribs so that the tension ribs can be bent.

32. A guider assembly according to claim 27, wherein the tension ribs of each said guider are positioned on an outer surface of said shaft at an initial assembly stage, and each said guider is moved to a predetermined point, and wherein each said guider is rotated on said shaft so as to hold the tension ribs in a respective one of the races of the shaft when movement of each said guider to the predetermined point is completed.

33. A guider assembly for a rotary component idling about a given point of a shaft within an idling space of the shaft, wherein said shaft has at least one race formed on said shaft on a side of said idling space;

said assembly comprising at least one guider having tension ribs held in said at least one race for allowing the rotary component to idle about said given point of the shaft.

34. A guider assembly according to claim 33, wherein said tension ribs comprise two tension ribs which are oppositely disposed with respect to each other.

35. A guider assembly according to claim 34, wherein said two tension ribs are level with each other.

36. A guider assembly according to claim 33, wherein each said guider has a body surrounding a shaft hole, and said tension ribs are disposed inside said body.

37. A guider assembly according to claim 36, wherein a tension space is formed between the body and the tension ribs so that the tension ribs can be bent.

38. A guider assembly according to claim 33, wherein the tension ribs of each said guider are positioned on an outer surface of said shaft at an initial assembly stage, and each said guider is moved to a predetermined point, and wherein each said guider is rotated on said shaft so as to hold the tension ribs in a respective one of said at least one race of the shaft when movement of each said guider to the predetermined point is completed.

* * * * *